Oct. 15, 1929.                T. H. RUSHTON                 1,731,870

SOLID RUBBER BAND TIRE FOR VEHICLE WHEELS

Filed Feb. 16, 1927

Patented Oct. 15, 1929

1,731,870

UNITED STATES PATENT OFFICE

THOMAS HENRY RUSHTON, OF WORKSOP, ENGLAND

SOLID-RUBBER BAND TIRE FOR VEHICLE WHEELS

Application filed February 16, 1927, Serial No. 168,770, and in Great Britain April 26, 1926.

This invention relates to solid india rubber band tires for the wheels of motor cars and other vehicles of the kind in which a solid tire of rubber composition is secured to a thin metal base band.

Ordinarily a solid rubber band tire is built up on a circumferentially channelled metal base band with hard junction rubber moulded to key into the undercut channels of the metal band and merged by means of rubber of intermediate softness into the softer rubber composing the body and tread of the tire. Such a construction of tire involves the presence of a large amount of rubber much of which is inert without any cushioning effect and merely serves to unite the body of the tire to the metal base band.

By securing a solid rubber band tire to a metal base band by moulding the rubber through apertures in the band into recesses at the face opposite to the tire, the solid rubber tire can be united to the metal base band without junction and intermediate rubber whereby, by dispensing with the latter, the entire amount of rubber present can be restricted to that required for cushioning purposes. Thus, quite apart from any adhesion of the rubber to the surface of the band, the tire is held to the band by a plurality of rubber heads on rubber stems passing through the apertures.

More particularly the invention aims at producing an apertured thin metal base band for solid rubber band tire in which the formation of the apertures stiffens the band whilst providing the recesses on the face opposite to the tire.

According to the invention, the borders of the apertures in a thin metal base band for a solid india rubber tire are embossed to provide the recesses on the face opposite to the tire.

The recessed apertures in the metal band are formed by punching and pressing a thin sheet steel band, the embossing thus effected stiffening the band whilst providing the recesses. Such an embossed apertured band is further stiffened by metal hoops of thicker section applied around the outer periphery of the border portions of the band and presenting undercut inwardly directed borders beneath which the rubber also becomes locked.

The apertures preferably are elongated transversely to the band.

A metal tire band formed as described above is of ample strength yet far less weight than the usual metal base band for a rubber band tire.

An example of a solid rubber band tire according to the invention is illustrated on the accompanying drawing, in which:—

$a$ is a thin steel strip punched at uniform intervals with apertures $b$, elongated transversely to the strip $a$. The material of the strip $a$ is also embossed at $c$ around the border of each transversely elongated aperture $b$ to provide recesses $d$ on one face of the strip $a$. The strip $a$ is bent to an annular form and its ends united, by welding or otherwise, and with the bosses $c$ presented on the external periphery and the recesses $d$ on the interior periphery, to constitute a base band for a tire.

Figure 4:
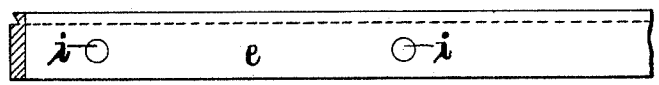
Fig. 4 is a plan of a portion of one of the outer border hoops, and also shows the section thereof.

The embossing at $c$ stiffens the band $a$ in addition to providing the recesses $d$. Further to stiffen the band $a$ and also to provide a channel for the reception of the base of the tire, a metal hoop $e$ (Figs. 1 and 4) is applied externally around each border of the band $a$, and is secured thereto, for instance by brazing, welding or other means.

The inwardly directed borders of the hoops $e$ are undercut to be engaged by the rubber at the base of the tire.

The rubber tire $f$, which may be throughout of homogeneous rubber composition of the usual cushioning qualities of the body and tread portion of an ordinary rubber band tire, is directly moulded on to the band $a$ without the interposition of junction and intermediate rubber. The rubber of the tire $f$ is moulded through the embossed apertures $b$, into the recesses $d$, wherein the rubber forms securing heads.

The rubber also is moulded beneath the undercut borders of the hoops $e$.

To provide additional interlocking of the rubber $f$ and the band $a$, and also to relieve from circumferential strain the stems of rubber which pass through the apertures $b$, and thus to oppose creeping, preferably the band $a$ near the middle and between the apertures is slit and the borders of the slit portions transverse to but not extending to the borders of the band, are bent outwards to form tongues $g$ and apertures $h$ by a stamping and plunging operation, in a manner similar to that already proposed for forming outstanding tongues by bending the borders of slits extending inwards from the borders of a thin metal tire base band. The tongues $g$ become embedded in the rubber $f$ and the rubber enters between them into the apertures $h$, thus also providing additional adhesion surfaces of the rubber to the metal.

The band $a$ with the rubber tire $f$ vulcanized thereon can be applied to the felloe of a wheel by being forced axially thereon in the usual way.

Alternatively or in addition to the attachment of the band to the felloe of a wheel being dependent upon frictional engagement, bolt holes $i$ may be provided at uniform intervals around the band $a$ and hoops $e$, whereby the band tire can be bolted by bolts $j$ to and passing through corresponding holes in the felloe.

Figure 1:
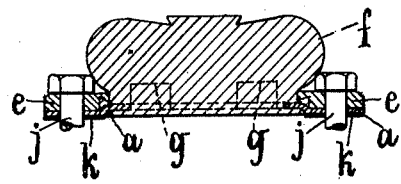
Fig. 1 is a cross section of the tire and band.
Figure 2:
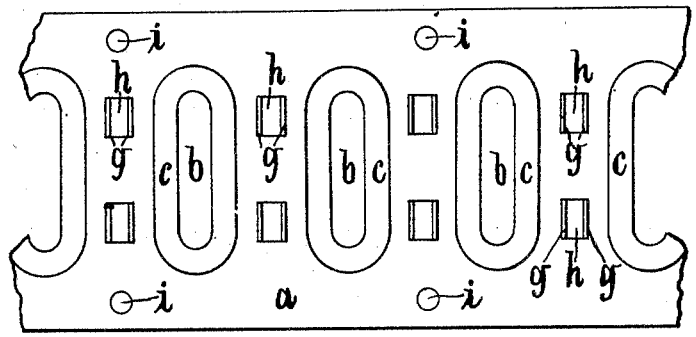
Figs. 2 and 3 are respectively a plan and a longitudinal section of a portion of the band without the tire.
Figure 3:
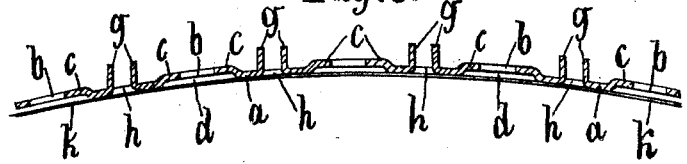

The rubber which is moulded through the apertures $b$ and $h$ tends to spread as a continuous web along the underside of the metal band $a$. To provide a space of slight yet appreciable depth in the mould for such spreading web of rubber and also to provide lateral metal surfaces in direct contact with the periphery of the felloe of the wheel, extremely thin metal hoops $k$ may be, as shown in Figs. 1 and 3, secured around the inner periphery of the borders of the metal band $a$, in the manner already proposed with hoops of more substantial thickness. Such thin hoops $k$ thus become interposed between the felloe and the metal band $a$ at the borders of the latter.

I claim:

A solid rubber band tire having in combination, a steel ring provided with a plurality of transverse apertures, embossed borders around said apertures, outwardly extending tongues formed on said ring, a solid rubber band tire directly moulded to said ring with a thin layer of rubber on the inner periphery of said ring and the borders of said ring extending from the sides of the tire, a metal hoop secured to each of the exposed borders of the ring, an undercut formed on the inner border of said hoops engaging with the sides of the tire, a thin metal base band secured around the inner periphery of the borders of the exposed portion of the ring, and said exposed borders interposed between and strengthening the metal hoops and thin base bands.

In testimony whereof I have hereunto set my hand.

THOMAS HENRY RUSHTON.